US008364939B2

(12) United States Patent
Minami et al.

(10) Patent No.: US 8,364,939 B2
(45) Date of Patent: Jan. 29, 2013

(54) SYSTEM FOR PERFORMING HARDWARE CALIBRATION DURING STARTUP, AND METHOD OF CALIBRATION

(75) Inventors: Aya Minami, Yamato (JP); Yohichi Miwa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/703,841

(22) Filed: Feb. 11, 2010

(65) Prior Publication Data

US 2010/0211768 A1     Aug. 19, 2010

(30) Foreign Application Priority Data

Feb. 13, 2009  (JP) .................................. 2009-31362

(51) Int. Cl.
G06F 9/24 (2006.01)
(52) U.S. Cl. ............................................... 713/1; 713/2
(58) Field of Classification Search .................... 713/1, 2
See application file for complete search history.

(56) References Cited

U.S. PATENT DOCUMENTS

| 5,991,896 | A * | 11/1999 | Cho | 714/23 |
| 6,735,709 | B1 * | 5/2004 | Lee et al. | 713/401 |
| 7,045,995 | B2 * | 5/2006 | Summers | 455/302 |
| 7,523,008 | B1 * | 4/2009 | Miwa et al. | 702/99 |
| 8,046,184 | B2 * | 10/2011 | Piipponen et al. | 702/85 |
| 2007/0192050 | A1 * | 8/2007 | Douniwa et al. | 702/85 |

FOREIGN PATENT DOCUMENTS

| JP | 2003-025691 A | 1/2003 |
| JP | 2003-044284 A | 2/2003 |
| JP | 2003-345074 A | 12/2003 |
| JP | 2005-119010 A | 5/2005 |
| JP | 2007-072057 A | 3/2007 |
| JP | 2007-200220 A | 8/2007 |
| WO | WO2004/102389 | 11/2004 |

OTHER PUBLICATIONS

IBM, Cell Broadband Engine CMOS SOI 10KE Hardware Initialization Guide Version 1.4, pp. 1-220 (Sep. 11, 2006).
Sony, Cell Broadband Engine Architecture Version 1.01, pp. 1-352 (Oct. 3, 2006).
Rambus—FlexPhase Timing Adjustments, http://www.rambus.com/jp/patents/innovations/detail/flexphase_timing.html, pp. 1-4 (Jun. 11, 2009).
Rambus—XDR メモリアーキテクチャ, http://www.rambus.com/jp/products/xdr/index.html, pp. 1-2 (Jun. 11, 2009).

* cited by examiner

*Primary Examiner* — Chun Cao
(74) *Attorney, Agent, or Firm* — Ido Tuchman; Libby Z. Toub

(57) ABSTRACT

Disclosed is a system including: a calibration executing unit that performs a calibration on hardware during the system startup so as to allow the system to properly operate; and a correction data retaining unit that retains a piece of correction information in association with an environmental condition during the calibration, the correction information indicating a setting for the hardware calibrated by the calibration executing unit. If the correction data retaining unit retains the correction information associated with an environmental condition equivalent to the environmental condition at a time when the system is started up, the calibration executing unit performs the hardware setting on the basis of the retained correction information instead of calibrating the hardware.

16 Claims, 3 Drawing Sheets

| SURROUNDING TEMPERATURE | CALIBRATION VALUE |
|---|---|
| 20°C | 1FF |
| 25°C | 20C |
| 30°C | 220 |

FIG. 3

| SURROUNDING TEMPERATURE | CALIBRATION VALUE |
|---|---|
| 20°C | 1FF |
| 21 | |
| 22 | |
| 23 | |
| 24 | |
| 25°C | 20C |
| 26 | |
| 27 | |
| 28 | |
| 29 | |
| 30°C | 220 |

FIG. 5

SYSTEM FOR PERFORMING HARDWARE CALIBRATION DURING STARTUP, AND METHOD OF CALIBRATION

BACKGROUND OF THE INVENTION

The present invention relates to a computer that performs a calibration on hardware during startup, in particular, performs a timing adjustment of a signal transmission, and also relates to a method of the calibration.

Cell Broadband Engine™ (hereinafter, referred to as a Cell processor) is connected to an XDR™ memory, which is a main memory, and an IO bridge via exclusive interfaces so as to secure high speed data transfer. In a system equipped with plural Cell processors, the Cell processors are connected to each other in the same manner (refer, for example, to "Cell Broadband Engine™ Architecture" (online), Sony Corporation (retrieved on Jan. 21, 2009 from an Internet URL: http://cell.scei.co.jp/pdf/CBE_Architecture_v101_j.pdf) as to a Cell processor, to, for example, "XDR™" (online), Rambus Inc. (retrieved on Jan. 21, 2009 from an Internet URL: http://www.rambus.com/jp/products/xdr/index.html) as to an XDR memory, and to, for example, "FlexPhase™ Timing Adjustments" (online), Rambus Inc. (retrieved on Jan. 21, 2009 from an Internet URL: http://www.rambus.com/jp/patents/innovations/detail/flexpha se_timing.html) as to the interface).

Having such connections between devices, a computer system (hereinafter, referred to simply as a "system") equipped with a Cell processor makes a timing adjustment of a signal transmission, which is called a calibration, after being powered on for startup (refer to, for example, "Cell Broadband Engine CMOS SOI 90 nm Hardware Initialization Guide" (online), International Business Machines Corporation (retrieved on Jan. 21, 2009 from an Internet URL: http://www-01.ibm.com/chips/techlib/techlib.nsf/techdocs/BD 3F1F4C3 DB32C7487257142006131BC)). Accordingly, signals subjected to the calibration are:

(1) signals transmitted between the Cell processor and an XDR memory;

(2) signals transmitted between the Cell processor and an IO bridge; and (3) signals transmitted between a Cell processor and another Cell processor (in a case where the system is equipped with plural Cell processors).

An appropriate timing of a signal transmission may vary greatly depending on individual difference among devices and on the surrounding temperature. The calibration is therefore executed every time the system is powered on.

In the calibration performed during startup of the system equipped with a Cell processor, an operation clock of the system is calibrated by transmitting signals having a specific pattern between any two of the Cell processor, XDR memory, and the IO bridge. Here, if the adjustments are repeatedly made by use of signals having various patterns, accuracy of the calibration is enhanced. On the other hand, the adjustments by use of the signals having such various patterns requires a longer time. That is, the more accurate calibration takes longer time. Therefore, the calibration with reduced time sacrifices the calibration accuracy. Here, the time required for the calibration considerably affects a startup time of the system, since the calibration is performed at every system startup.

Furthermore, a time required for the calibration linearly increases as a capacity of a memory included in a system becomes larger. In other words, a system having a larger memory capacity requires a longer time for the calibration, and accordingly requires a longer time for the system startup. In order to reduce a system startup time, there has been so far no choice but to reduce the calibration accuracy to reduce the time required for the calibration.

Note that, while a system equipped with a Cell processor is described here, any other system requiring hardware calibration during startup can be considered as having the same problem.

SUMMARY OF THE INVENTION

The present invention may be used to solve the above problem, and to achieve both of enhancement in adjustment accuracy and reduction in system startup time in a system that performs a calibration on hardware during startup.

One example embodiment of the invention is a system. This system includes: a calibration executing unit that performs a calibration on hardware during the system startup so as to allow the system to properly operate; and a retaining unit that retains a piece of correction information in association with an environmental condition during the calibration, the correction information indicating a setting for the hardware calibrated by the calibration executing unit. If the retaining unit retains a piece of the correction information associated with an environmental condition equivalent to the environmental condition at a time when the system is started up, the calibration executing unit performs the hardware setting on the basis of the correction information instead of calibrating the hardware.

The above system may further include a startup controlling unit that starts up the system if a startup condition set based on an environmental condition is satisfied. In this case, when the startup controlling unit starts up the system in response to the satisfaction of the startup condition, the calibration executing unit performs a calibration on the hardware regardless of whether or not the correction information is retained in the retaining unit.

It is more preferable that, if the retaining unit already retains a piece of the correction information associated with an environmental condition equivalent to the environmental condition at a time when the startup controlling unit starts up the system in response to the satisfaction of the startup condition, the calibration executing unit generates a new piece of the correction information on the basis of the hardware setting acquired through the calibration and on the basis of the piece of the correction information already retained in the retaining unit, and then causes the retaining unit to retain the new piece of the correction information.

In addition, the system may further include a temperature monitoring unit that acquires a temperature surrounding the hardware at a time when the calibration executing unit performs the calibration on the hardware. The retaining unit retains, as the environmental condition, at least the temperature acquired by the temperature monitoring unit, in association with the piece of the correction information.

Moreover, for the calibration of the hardware, the calibration executing unit adjusts timing of a signal transmission between semiconductor chips included in the system.

Alternatively, the present invention is formed as the following system. This system includes: a startup controlling unit that starts up the system when any one of at least two different startup conditions is satisfied; an adjusting unit that, when the system is started up in response to the satisfaction of a first one of the startup conditions, performs an adjustment for acquiring the hardware setting allowing the system to properly operate; a retaining unit that retains a piece of correction information indicating the hardware setting that is acquired through the adjustment by the adjusting unit and allows the system to properly operate; and a setting unit that, when the system is started up in response to the satisfaction of a second one of the startup conditions, performs the hardware setting on the basis of the piece of the correction information retained by the retaining unit.

It is more preferable that the first startup condition is set based on an environmental condition including at least a temperature surrounding the hardware; and the retaining unit retains the piece of the correction information in association with the environmental condition at a time when the adjusting unit performs a calibration on the hardware.

It is further preferable that the setting unit performs the hardware setting on the basis of the piece of the correction information associated with an environmental condition equivalent to the environmental condition at a time when the system is started up.

It is further more preferable that if the retaining unit does not retain the piece of the correction information associated with the environmental condition equivalent to the environmental condition at a time when the system is started up, the setting unit finds, on the basis of the piece of the correction information retained in the retaining unit, the hardware setting that is to be made under the environmental condition at a time when the system is started up, and then performs the hardware setting.

Additionally, the present invention is implemented as a method of starting up a system which performs a hardware setting during system startup. This method includes the steps of: starting up the system when any one of at least two different startup conditions is satisfied; when the system is started up in response to the satisfaction of a first one of the startup conditions, performing an adjustment for acquiring the hardware setting allowing the system to properly operate; retaining a piece of correction information in a retaining unit, the piece of the correction information indicating the hardware setting that is acquired through the adjustment, and allows the system to properly operate; and when the system is started up in response to the satisfaction of the second one of the startup conditions, performing a hardware setting on the basis of the piece of the correction information retained in the retaining unit.

The present invention configured as described above can achieve both of enhancement in adjustment accuracy and reduction in system startup time in a system that performs a calibration on hardware during startup.

BRIEF DESCRIPTION OF THE DRAWINGS

For a more complete understanding of the present invention and the advantage thereof, reference is now made to the following description taken in conjunction with the accompanying drawings.

FIG. 3 is a diagram showing an example of a mapping table of correction information retained in a correction data retaining unit of this embodiment.

FIG. 5 is a diagram illustrating a mapping table similar to the mapping table shown in FIG. 3 with degrees of temperature being taken at intervals of 1° C.

DETAILED DESCRIPTION OF THE PREFERRED EMBODIMENT

An embodiment of the present invention will be described below in detail with reference to accompanying drawings.

In this embodiment, the system is automatically started up under a certain condition, and performs a calibration on hardware for acquiring such a setting of the hardware that the system is caused to properly operate. In addition, the system stores the settings of the hardware as correction information in association with information on conditions (a temperature or the like) under which the hardware is calibrated, the settings thus obtained by the adjustment. In addition, when being started up by a user operation (that is, when the user uses the system), if any correction information corresponding to a condition for the startup is already stored, the system makes a setting for the hardware by using this correction information without adjusting the hardware again.

In the following description, a system equipped with a Cell processor is used as the system that performs a calibration on hardware during startup. In the system equipped with a Cell processor, a calibration is performed during the system startup for adjusting timing of signal transmissions between each two semiconductor chips (hereinafter, referred to simply as "chips"), at least one of the semiconductor chips being a Cell processor. In this embodiment, when being automatically started up under a certain condition, the system performs the calibration for the adjustment of the hardware, then acquires such a timing setting of a signal transmission that the system is caused to properly operate, and then stores information on the thus acquired setting as one piece of the correction information. Then, when being started up by a user operation, the system makes a timing setting of a signal transmission by using the stored correction information.

<System Configuration>

Figure 1:
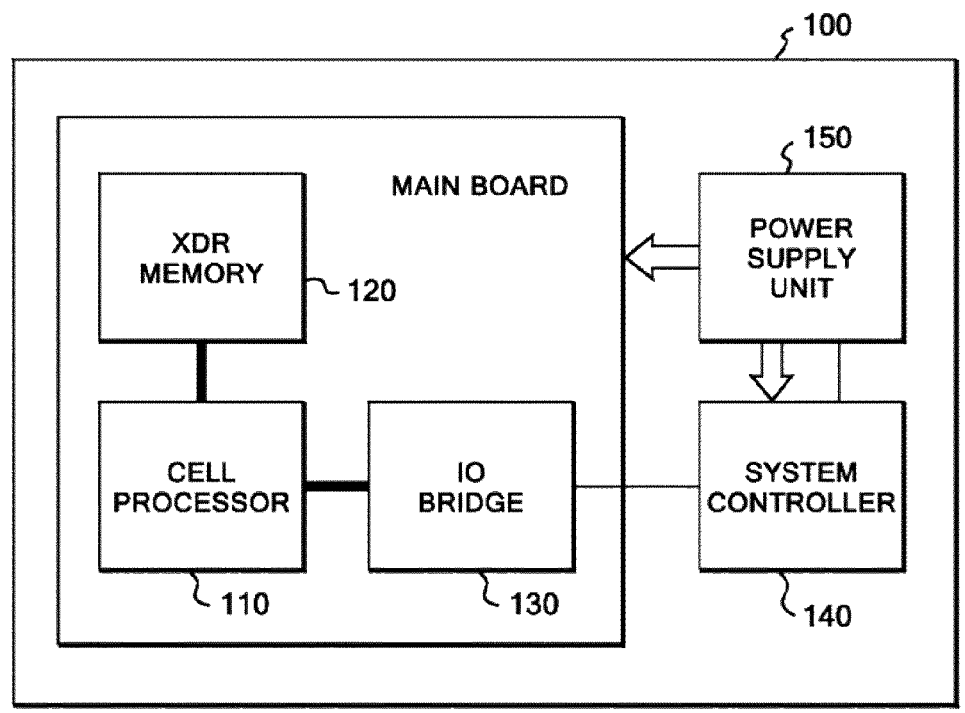
FIG. 1 is a diagram showing a configuration example of a system equipped with a Cell processor, an embodiment of the present invention applied to the system.

FIG. 1 is a diagram showing a configuration example of a system equipped with a Cell processor, this embodiment applied to the system.

As shown in FIG. 1, a system 100 of this embodiment includes a Cell processor 110, an XDR memory 120, and an IO bridge 130. Additionally, the system 100 includes a system controller 140 that performs, for example, control over operation of the system during startup thereof, and a power supply unit 150 that supplies power to each unit thereof.

Additionally, as shown in FIG. 1, the Cell processor 110, the XDR memory 120 and the IO bridge 130 are mounted on a main board. The Cell processor 110 and the XDR memory 120 are connected via FlexIO (trademark), and the Cell Processor 110 and the IO bridge 130 are connected via FlexIO (trademark). Although FIG. 1 shows a configuration having only one Cell processor 110 mounted on the main board, plural Cell processors 110 may be mounted thereon. In this case, the Cell processors 110 are connected also via FlexIO.

The system controller 140 performs a startup control of the system 100. Additionally, the system controller 140 performs a calibration between the abovementioned chips on the main board during system startup. Details of functions of this system controller 140 will be described later. Although not particularly illustrated, the system controller 140 includes: a processor; a ROM which stores a program executed by the processor and data used for processing performed by the processor; and a RAM used as a working storage. By means of a later described configuration of the power supply unit 150, the system controller 140 is battery-backed up even when a main power supply is OFF.

The power supply unit 150 supplies power to the above-mentioned chips on the main board and to the system controller 140. This power supply unit 150 includes at least the main power supply and a standby power supply (both unillustrated), and a power-supplying state of the power supply unit 150 is categorized into the following three states (Power States) including:

State-1: All of the power supplies are OFF
State-2: The standby power supply is ON and the main power supply is OFF, and
State-3: The standby power supply is ON and the main power supply is ON.

Here, the chips on the main board are supplied with power by the main power supply. Meanwhile, the system controller 140 is supplied with power by the standby power supply. That is, both the chips on the main board and the system controller 140 do not operate in State-1, and only the system controller 140 operates in State-2. In State-3, both the chips on the main board and the system controller 140 operate. Normally, in a state where a power supply of the system 100 is turned off, only the main power supply is turned OFF, and the system controller 140 is operable.

<Functional Configuration of System Controller 140>

Figure 2:
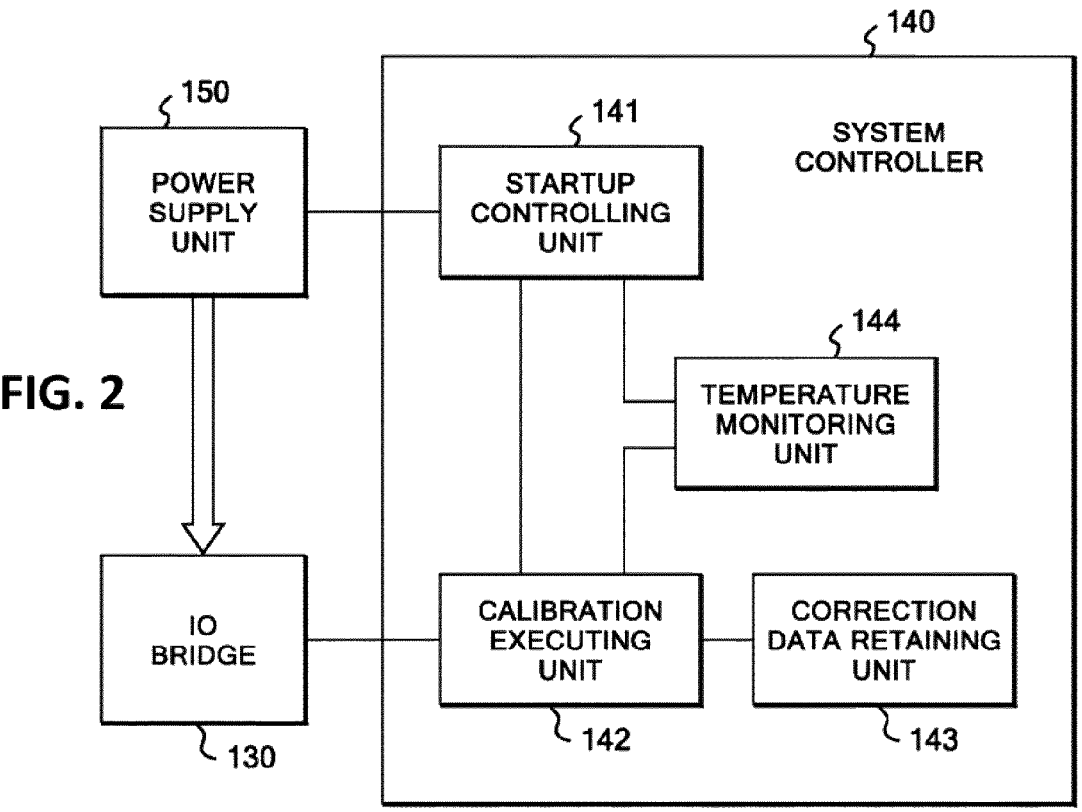
FIG. 2 is a diagram showing a functional configuration example of a system controller of this embodiment.

FIG. 2 is a diagram showing a functional configuration example of the system controller 140.

As shown in FIG. 2, the system controller 140 includes a startup controlling unit 141, a calibration executing unit 142, a correction data retaining unit 143 and a temperature monitoring unit 144. Note that, the functional blocks of the system controller 140 operate with the power supplied by the standby power supply in the power supply unit 150, as described above. Note that the functional blocks of the system controller 140, which are shown in FIG. 2, are provided for achieving characteristic functions in this embodiment. In reality, the system controller 140 has various functions other than these functions, the various functions including a control over the number of rotations of a cooling fan, and the like.

The startup controlling unit 141 is implemented, for example, by a program-controlled processor of the system controller 140, is connected to the power supply unit 150, and controls the main power supply that supplies power to the main board. Specifically, upon detecting operation performed by a user for power-on (upon detecting, for example, that a user presses down a power supply button), the startup controlling unit 141 turns ON the main power supply, and starts up the system 100. Additionally, if a preset certain condition is satisfied, the startup controlling unit 141 of this embodiment turns ON the main power supply, and starts up the system 100. Although described later in detail, this is for the purpose of automatically starting up the system 100 under a certain condition and executing calibrations (timing adjustments of signal transmissions).

A time condition and an environmental condition are set as main startup conditions used for automatically starting up the system 100. The time condition can be dedicatedly and appropriately set in accordance with a practical usage status and the like of the system 100. Here, it is desirable that the system 100 be automatically started up when not being used by the user. Therefore, a time condition is set so that the system 100 can be started up when not in use, such as in the midnight or on weekends, for example. Additionally, elapse of a certain period of time after the main power supply is turned OFF may be added as one of the startup conditions.

Additionally, in this embodiment, a temperature condition is particularly set as the environmental condition. This is because characteristics of a signal transmission between the chips are substantially affected by a change in a surrounding temperature. Specifically, the temperature condition can be set in a way that the system 100 may be started up when a surrounding temperature changes by a degree corresponding to the set temperature interval. This setting causes the calibration to be executed at fixed temperature intervals (for example, every 5° C.), for example. Note that the environmental condition is not limited to a temperature condition, and other kinds of conditions which affect the adjustment target hardware can be set as the environmental condition.

The calibration executing unit 142 is implemented, for example, by a program-controlled processor of the system controller 140, is connected to the IO bridge 130 on the main board, and executes the calibration to make a timing setting of a signal transmission between the chips. That is, the calibration executing unit 142 functions as an adjusting unit that performs adjustment for acquiring settings of hardware, and as a setting unit that makes a setting for the hardware on the basis of a correction information acquired through the adjustment.

In the calibration, signals having specific patterns are transmitted between the Cell processor 110 and the XDR memory 120 and between the Cell processor 110 and the IO bridge 130 while an operation clock is changed variously, and results of the operations are checked. Thereby, a timing (hereinafter referred to as a clock timing) of the operation clock that causes the system 100 to properly operate is specified. Then, a setting of timing (hereinafter, referred to as a timing setting) of a signal transmission is made based on the thus specified clock timing. In a case where plural Cell processors 110 are installed in the system 100, the same operation is performed also for a signal transmission between any two of these Cell processors 110.

Specifically, the calibration may be carried out in the following manner, for example. Firstly, one cycle of the operation clock is divided into 0x000 to 0x3FF, for example. Then, signals which have the same pattern are respectively transmitted to divided units one after another, while the operation clock is shifted per unit, whereby clock timings that cause the system 100 to properly operate are specified. In the calibration, an appropriate clock timing is acquired not by use of a single signal pattern but by use of various signal patterns. This makes it possible to enhance accuracy of the timing setting, and allows the system 100 to operate stably.

Additionally, depending on a startup status of the system 100, the calibration executing unit 142 in this embodiment sometimes makes a timing setting without performing the calibration. Meanwhile as has been described above, the startup control performed by the startup controlling unit 141 includes: a case where the system 100 is automatically started up when a certain startup condition including the environmental condition is satisfied; and a case where the system 100 is started up in response to a startup operation performed by the user.

The former case of the automatic startup is for acquiring the correction information. Accordingly, in this case, the calibration executing unit 142 executes the calibration. Thereby, an appropriate clock timing that causes the system 100 to properly operate corresponding to an environmental condition (a surrounding temperature) is specified. The thus acquired clock timing is stored as a piece of the correction data.

Meanwhile, the latter case of the startup based on a user operation is for the user to use the system 100. Therefore, reduction of a startup time is desired. Accordingly, in principle, the calibration is not performed in this case, and a timing setting is made on the basis of the correction data (clock timings) already stored. Thereby, a startup time is reduced by an amount of time corresponding to that required for the calibration.

The correction data retaining unit 143 is implemented, for example, by the RAM of the system controller 140, retains as the correction information, clock timings acquired through execution of the calibration by the calibration executing unit 142. As has been mentioned above, since the startup controlling unit 141 starts up the system 100 on the basis of the preset environmental condition, the clock timings acquired from the calibrations can be associated with environmental conditions at times when the system 100 is started up. Accordingly, the correction data retaining unit 143 retains therein the correction information, for example, in the form of a mapping table in which the clock timings are associated with environmental conditions (a surrounding temperature).

FIG. 3 is a diagram showing an example of the mapping table of the correction information retained in the correction data retaining unit 143.

In the mapping table shown in FIG. 3, correction values (shown as "calibration values" in FIG. 3) for clock timings which are acquired through the calibrations are retained in association with the surrounding-temperature values. In this example, it is assumed that the calibrations are performed at intervals of 5° C. for degrees of the surrounding temperature in the range of 20° C. to 30° C. By referring to the illustrated mapping table, correction values at degrees of the surrounding temperature of 20° C., 25° C., and 30° C. are found to be 1FF, 20C, and 220, respectively.

The temperature monitoring unit 144 is implemented, for example, by a program-controlled processor of the system controller 140, is connected to an unillustrated temperature sensor, and monitors a surrounding temperature to acquire temperature information. Here, the surrounding temperature is a temperature around the chips on the main board, that is, a temperature inside a housing of the system 100. Depending on a use environment of the system 100, the surrounding temperature may be a temperature inside a room in which the system 100 is installed, or the like. The temperature information acquired from the temperature monitoring unit 144 is transmitted to the startup controlling unit 141 and the calibration executing unit 142. The startup controlling unit 141 judges, on the basis of this temperature information, whether or not any one of the startup conditions used for automatically starting up the system 100 are satisfied. The calibration executing unit 142 associates an environmental condition with a clock timing acquired through the calibration, the condition including this temperature information.

<Operation Performed During System Startup>

Next, operation of the system controller 140 performed during startup of the system 100 will be described.

Figure 4:
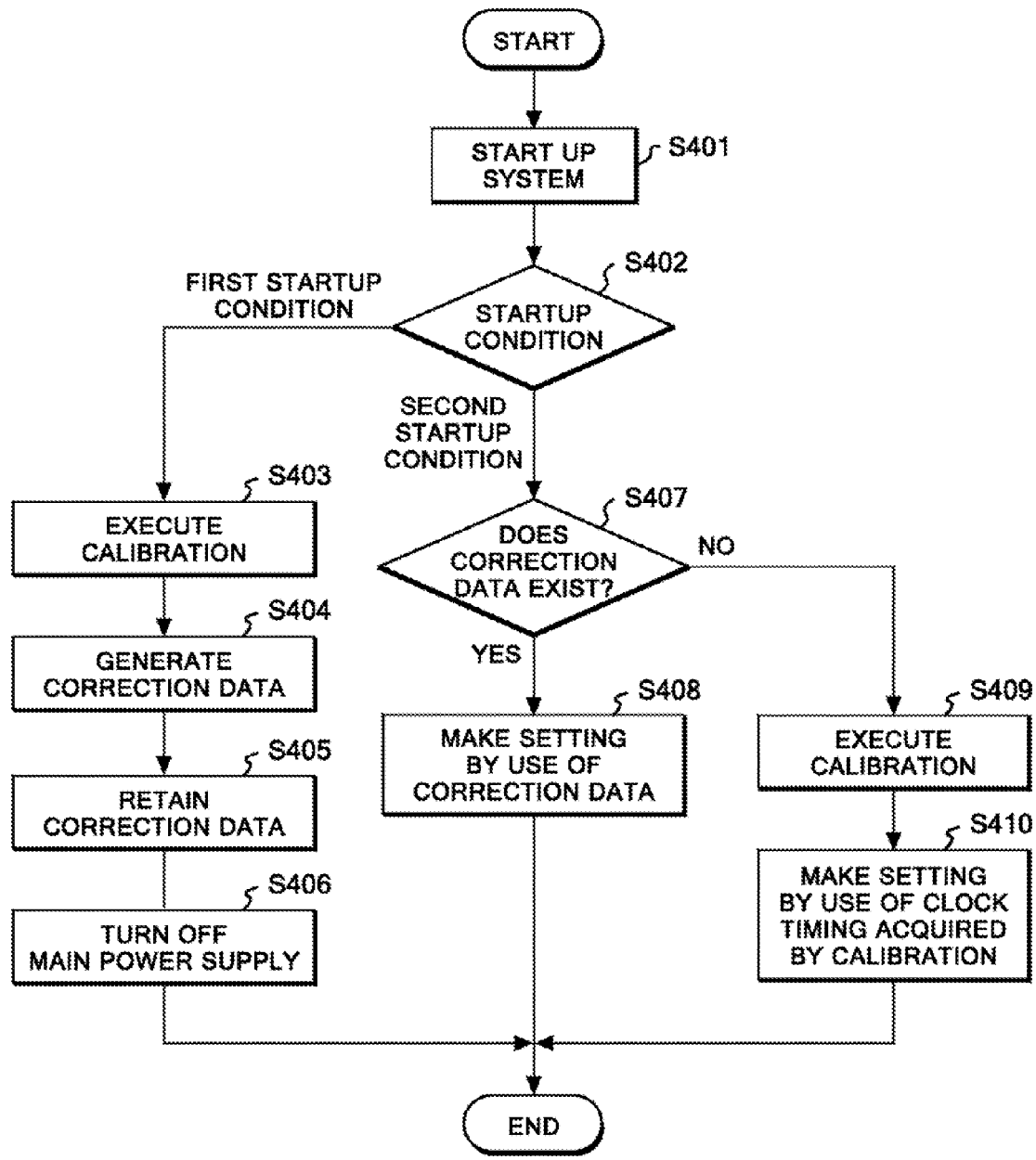
FIG. 4 is a flowchart showing an operation flow of the system controller of this embodiment.

FIG. 4 is a flowchart showing an operation flow of the system controller 140.

As has been mentioned above, the startup controlling unit 141 starts up the system 100 at times when the certain startup condition including the environmental condition is satisfied, and at times when the startup operation performed by the user is accepted. Here, the startup condition in the former case will be referred to as a first startup condition, while the startup operation performed by the user in the latter case will be referred to as a second startup condition. Accordingly, the startup controlling unit 141 starts up the system 100 (Step S401) when any one of the first startup condition and the second startup condition is satisfied.

The first startup condition can be specifically set as a case, for example, where the temperature information (a surrounding temperature) acquired from the temperature monitoring unit 144 shows a change (increase or decrease) by 5° C. Additionally, a time condition is also included in the first startup condition, as described above. Accordingly, according to this example, during hours satisfying the time condition, when the temperature information changes (increases or decreases) by 5° C. since the main power supply of the power supply unit 150 is turned OFF, the system 100 is automatically started up in response to the satisfaction of the first startup condition.

When the system 100 is automatically started up in response to the satisfaction of the first startup condition (Step S402), the calibration executing unit 142 executes a calibration, and acquires a clock timing (a correction value) (Step S403). Then, the calibration executing unit 142 generates correction information by associating, with the thus acquired clock timing, the temperature information acquired from the temperature monitoring unit 144 (Step S404), and stores the correction information in the correction data retaining unit 143 (Step S405). Then, the calibration executing unit 142 performs end processing of the system 100, and turns OFF the main power supply (Step S406).

On the other hand, when the system 100 is started up in response to the satisfaction of the second startup condition (Step S402), the calibration executing unit 142, first of all, search the correction data retaining unit 143 for a piece of the correction information on the basis of temperature information acquired from the temperature monitoring unit 144. If a clock timing (a piece of correction information) associated with this temperature information is retained in the correction data retaining unit 143 (Yes in Step S407), the calibration executing unit 142 makes a timing setting of a signal transmission between the semiconductor chips by using this piece of correction information (Step S408).

If a clock timing (a piece of correction information) associated with this temperature information acquired from the temperature monitoring unit 144 is not yet retained in the correction data retaining unit 143 (No in Step S407), the calibration executing unit 142 executes the calibration (Step S409). Then, the calibration executing unit 142 makes a timing setting of a signal transmission between the semiconductor chips by using a clock timing (a correction value) acquired through the calibration (Step S410).

According to the above operation, when the system 100 is started up in response to the satisfaction of the first startup condition, the system 100 is not intended to be used by the user, and reduction of a startup time is therefore not demanded. Accordingly, highly accurate correction information on clock timing can be acquired through the execution of the calibration by use of various signal patterns. On the other hand, when the system 100 is started up in response to the satisfaction of the second startup condition, the system 100 is intended to be used by the user, and a shorter startup time is therefore preferable. In this case, in this embodiment, as long as there is a piece of the correction information whose environmental condition is equivalent to the current environmental condition, a timing setting can be made by use of this piece of correction information instead of performing the calibration. Accordingly, highly accurate timing settings can be made by use of the correction information, and a startup time of the system 100 can be reduced by an amount of time otherwise required for the calibration.

In the above operation example, if there is no correction information whose environmental condition is equivalent to the environmental condition at the time of the startup, a clock timing is acquired through the execution of the calibration (refer to Step S409). Therefore, the startup in this case requires the same amount of time as in a conventional system that performs a calibration during the startup. Even in this case, a startup time of the system 100 may be possibly reduced in such a way that a piece of the correction information, whose environmental condition is equivalent to the environmental condition at the time of the startup is generated through interpolation using the pieces of the correction information that are already retained in the correction data retaining unit 143.

FIG. 5 is a diagram illustrating a mapping table similar to the mapping table shown in FIG. 3 with degrees of the temperature being taken at intervals of 1° C.

By referring to FIG. 5, correction values (calibration values) for clock timings are found recorded only for degrees of the surrounding temperature at 20° C., 25° C. and 30° C. Meanwhile, the calibrations have not been performed for degrees of the temperature between 20° C. and 25° C., and between 25° C. and 30° C. (21° C. to 24° C. and 26° C. to 29° C.), and no correction values are found recorded therefor. Accordingly, a timing setting cannot be made by use of the pieces of the correction information if a surrounding temperature at a time when the system 100 is started up by a user operation or the like in response to the satisfaction of the second startup condition, is, for example, 27° C.

However, a correction value for clock timing at a particular temperature A in the system 100 equipped with the Cell processor 110 generally falls within a range between a correction value of clock timing at a temperature B lower than the temperature A and a correction value of clock timing at a temperature C higher than the temperature A. That is, a correction value S of clock timing when a surrounding temperature at the startup of the system 100 is 27° C. falls within the range of:

$$0x20C < S < 0x220.$$

Accordingly, if this characteristic is taken into account, an appropriate correction value of the clock timing can be estimated although the calibration accuracy is lowered than that acquired through an actual calibration. Then, by use of the thus estimated correction value, a timing setting can be made without the calibration being performed, whereby a startup time can be substantially reduced.

Additionally, while the calibration performed when the system 100 is started up in response to the satisfaction of the first startup condition is for acquiring a piece of correction information as has been mentioned above, plural calibrations may be performed for the same surrounding temperature. After the plural calibrations, new correction information is generated on the basis of the correction information acquired through the execution of the calibration, and of the correction information that are already retained in the correction data retaining unit 143, and contents of the correction data retaining unit 143 are updated. For example, results of most recent five calibrations are accumulated, and an average thereof is figured out to be set as the new correction information. By use of the correction information thus appropriately updated, accuracy in timing settings is expected to be further enhanced.

This embodiment has been described as above by taking as an example the system 100 equipped with the Cell processor 110. However, the present embodiment is not limited by the abovementioned specific system configuration example, and the operation example. For example, in the above-mentioned examples, a surrounding temperature change by a fixed degree (5° C.) is set as a startup condition (the first startup condition) based on the environmental condition, and the system 100 is configured to be started up when the surrounding temperature changes by 5° C. Instead of the surrounding temperature change, a certain number of degrees of the surrounding temperature at appropriate temperature intervals may be designated in advance as startup conditions for the system 100, and the system 100 may be configured to be started up when the surrounding temperature reaches any of the designated degree of temperature.

Additionally, although the startup operation performed by the user is set as the second startup condition in the above-mentioned example, a time set on a timer may be set as the second startup condition in a case where the system 100 should be automatically started up at a particular time (such as at the start of the business hour)

Additionally, application of this embodiment is not limited to the above-described case where a timing adjustment of signal transmission is performed in the system 100 equipped with the Cell processor 110. This embodiment can be widely applied to various systems that perform hardware settings during system startup so as to allow the systems to properly operate. In a case where this embodiment is applied to another system, a startup condition of the system will be set based on any specific environmental condition that affects hardware settings, and pieces of correction information that correspond to the specific settings of hardware will be stored.

Although the preferred embodiment of the present invention has been described in detail, it should be understood that various changes, substitutions and alternations can be made therein without departing from spirit and scope of the inventions as defined by the appended claims.

What is claimed is:

1. A system that performs a hardware setting during system startup, the system comprising:
    a calibration executing unit that performs a calibration on hardware during the system startup so as to allow the system to properly operate;
    a retaining unit that retains in computer readable memory correction information in association with an environmental condition during the calibration, the correction information indicating a setting for the hardware calibrated by the calibration executing unit,
    wherein if the retaining unit retains the correction information associated with an environmental condition equivalent to the environmental condition at a time when the system is started up, the calibration executing unit performs the hardware setting on the basis of the correction information instead of calibrating the hardware; and
    wherein the correction information is generated based on a plurality of correction information associated with the environmental condition during previous and current calibrations.

2. The system according to claim 1, further comprising:
    a startup controlling unit that starts up the system on condition that a startup condition set based on the environmental condition is satisfied, wherein,
    in a case where the startup controlling unit starts up the system in response to the satisfaction of the startup condition, the calibration executing unit performs the calibration on the hardware regardless of whether or not the correction information is retained in the retaining unit.

3. The system according to claim 2, wherein, in a case where the retaining unit already retains the correction information associated with the environmental condition equivalent to the environmental condition at the time when the startup controlling unit starts up the system in response to the satisfaction of the startup condition, the calibration executing unit generates new correction information on the basis of the hardware setting acquired through the calibration and on the basis of the correction information already retained in the retaining unit, and then causes the retaining unit to retain the new correction information.

4. The system according to claims 1, further comprising
a temperature monitoring unit that acquires a temperature surrounding the hardware at a time when the calibration executing unit performs the calibration on the hardware, wherein
the retaining unit retains, as the environmental condition, at least the temperature acquired by the temperature monitoring unit, in association with the correction information.

5. The system according to claim 1, wherein, for the calibration of the hardware, the calibration executing unit adjusts timing of a signal transmission between semiconductor chips included in the system.

6. A system that performs a hardware setting during system startup, comprising:
a startup controlling unit that starts up the system on condition that any one of a set of at least two different startup conditions is satisfied;
an adjusting unit that, on condition that the system is started up in response to the satisfaction of a first one of the startup conditions, performs an adjustment for acquiring the hardware setting allowing the system to properly operate;
a retaining unit that retains in computer memory correction information indicating the hardware setting that is acquired through the adjustment by the adjusting unit and allows the system to properly operate;
a setting unit that, on condition that the system is started up in response to the satisfaction of a second one of the startup conditions, performs the hardware setting on the basis of the correction information retained by the retaining unit; and
wherein the correction information is generated based on a plurality of correction information associated with the environmental condition during previous and current calibrations.

7. The system according to claim 6, wherein:
the first startup condition is set based on an environmental condition including at least a temperature surrounding the hardware; and
the retaining unit retains the correction information in association with the environmental condition at a time when the adjusting unit performs a calibration on the hardware.

8. The system according to claim 7, wherein the setting unit performs the hardware setting on the basis of the correction information associated with the environmental condition equivalent to the environmental condition at a time when the system is started up.

9. The system according to claim 8, wherein:
in a case where the retaining unit does not retain the correction information associated with the environmental condition equivalent to the environmental condition at the time when the system is started up, the setting unit finds, on the basis the correction information retained in the retaining unit, the hardware setting that is to be made under the environmental condition at the time when the system is started up, and then performs the hardware setting.

10. A system that adjusts timing of a signal transmission between semiconductor chips during system startup, comprising:
a startup controlling unit that starts up the system on condition that any one of a set of a first startup conditions and a second startup condition is satisfied, the first startup condition being set based on an environmental condition including at least a temperature surrounding the hardware of the system;
a calibration executing unit that, during the system startup, makes a timing setting of a signal transmission between semiconductor chips included in the system so as to allow the system to properly operate; and
a retaining unit that retains in computer memory a piece of correction information in association with the environmental condition at a time when the timing setting of the signal transmission is made by the calibration executing unit, the correction information indicating the timing setting made by the calibration executing unit,
wherein:
in a case where the system is started up in response to the satisfaction of the first startup condition, the calibration executing unit performs an adjustment for acquiring a timing setting of the signal transmission, and then causes the retaining unit to retain the correction information indicating the setting that is acquired through the adjustment and allows the system to properly operate;
in a case where the system is started up in response to the satisfaction of the second startup condition, and on condition that the retaining unit retains the correction information associated with an environmental condition equivalent to the environmental condition at the time when the system is started up, the calibration executing unit makes the timing setting of the signal transmission on the basis of the correction information; and
wherein the correction information is generated based on a plurality of correction information associated with the environmental condition during previous and current calibrations.

11. A method of starting up a system which performs a hardware setting during system startup, comprising the steps of:
starting up the system on condition that any one of a set of at least two different startup conditions is satisfied;
on condition that the system is started up in response to the satisfaction of a first one of the startup conditions, performing an adjustment for acquiring the hardware setting allowing the system to properly operate;
retaining in computer memory a piece of correction information in a retaining unit, the correction information indicating the hardware setting that is acquired through the adjustment, and allows the system to properly operate;
on condition that the system is started up in response to the satisfaction of the second one of the startup conditions, performing a hardware setting on the basis of the correction information retained in the retaining unit; and
wherein the correction information is generated based on a plurality of correction information associated with the environmental condition during previous and current calibrations.

12. The method according to claim 11, wherein:
the first startup condition is set based on an environmental condition including at least a temperature surrounding the hardware;
in the step of retaining the correction information, the correction information is retained in association with the environmental condition at a time when the adjustment of the hardware is performed; and
in the step of performing a hardware setting, the hardware setting is made on the basis of the correction information associated with an environmental condition equivalent to the environmental condition at a time when the system is started up.

13. The system according to claim 1, wherein the correction information is generated from an average of the plurality of correction information.

14. The system according to claim 6, wherein the correction information is generated from an average of the plurality of correction information.

15. The system according to claim 10, wherein the correction information is generated from an average of the plurality of correction information.

16. The method according to claim 11, wherein the correction information is generated from an average of the plurality of correction information.

* * * * *